(12) United States Patent
Beversdorf et al.

(10) Patent No.: US 6,745,889 B2
(45) Date of Patent: Jun. 8, 2004

(54) ARTICULATING CABINET SUPPORT ASSEMBLY FOR MOVING CONVEYOR SYSTEM

(75) Inventors: David Beversdorf, Galesburg, IL (US); Dale L. Brooks, Abingdon, IL (US); Bob Dodge, Aledo, IL (US); Donald D. Dowell, Jr., Kewanee, IL (US); Dennis Easley, Cameron, IL (US); David Fawer, Galesburg, IL (US); Wayne Glisan, Galva, IL (US); Michael E. Groff, Galesburg, IL (US); Edwin C. Hunter, Galesburg, IL (US); William H. Mast, Galesburg, IL (US); Richard J. Miller, Galesburg, IL (US); Deborah A. Morse, Maquon, IL (US); Frances Piester, Lafayette, IL (US); James E. Rounds, Galesburg, IL (US); Joe R. Torrance, Oquawka, IL (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/252,577

(22) Filed: Sep. 24, 2002

(65) Prior Publication Data

US 2003/0057056 A1 Mar. 27, 2003

Related U.S. Application Data

(60) Provisional application No. 60/324,042, filed on Sep. 24, 2001.

(51) Int. Cl.[7] ............................................. B65G 47/10
(52) U.S. Cl. ............. 198/370.04; 198/802; 198/377.02
(58) Field of Search .......................... 198/802, 377.02, 198/370.04

(56) References Cited

U.S. PATENT DOCUMENTS

| 3,265,190 A | 8/1966 | Boehm |
| 3,463,298 A | 8/1969 | Harrison |
| 3,510,014 A * | 5/1970 | Speaker et al. ............. 414/384 |
| 3,974,909 A * | 8/1976 | Johnson .................. 198/370.04 |
| 4,004,681 A * | 1/1977 | Clewett et al. ........ 198/370.03 |
| 4,089,404 A | 5/1978 | Venzke |
| 4,635,785 A | 1/1987 | Prydtz |
| 4,722,430 A | 2/1988 | Canziani |
| 4,787,498 A * | 11/1988 | Males et al. ........... 198/370.04 |
| 4,846,335 A * | 7/1989 | Hartlepp ................. 198/370.04 |
| 5,348,132 A | 9/1994 | Maier |
| 5,381,882 A | 1/1995 | Ostholt |
| 5,570,773 A * | 11/1996 | Bonnet ................... 198/370.04 |
| 5,730,273 A | 3/1998 | Boller |
| 5,746,301 A * | 5/1998 | Maier ..................... 198/370.04 |
| 5,836,436 A * | 11/1998 | Fortenbery et al. .... 198/370.03 |
| 5,857,555 A | 1/1999 | Maier et al. |
| 6,082,522 A | 7/2000 | Polling |
| 6,231,293 B1 | 5/2001 | Ostholt et al. |
| 6,247,576 B1 | 6/2001 | Bonnet |

* cited by examiner

*Primary Examiner*—Richard Ridley
(74) *Attorney, Agent, or Firm*—Diederiks & Whitelaw, PLC

(57) ABSTRACT

An articulating cabinet support assembly for a moving conveyor system includes a base assembly, fixed to the conveyor, and a movable support arm. A cabinet traveling down an assembly line is arranged on the support arm as the cabinet proceeds through various assembly stations. The support arm can articulate relative to the base assembly from a home, normally horizontal position to a position angled with respect to the direction of travel in order to enhance assembly procedures. An adjustable arm assembly including a cam roller and roller guide structure are provided to establish the home position and to counterbalance the weight of the cabinet. A tilt stop mechanism is employ to enable adjustments in the degree of pivoting of the support arm and provisions are made to automatically reposition the cabinet in the home position following various assembly stages.

24 Claims, 12 Drawing Sheets

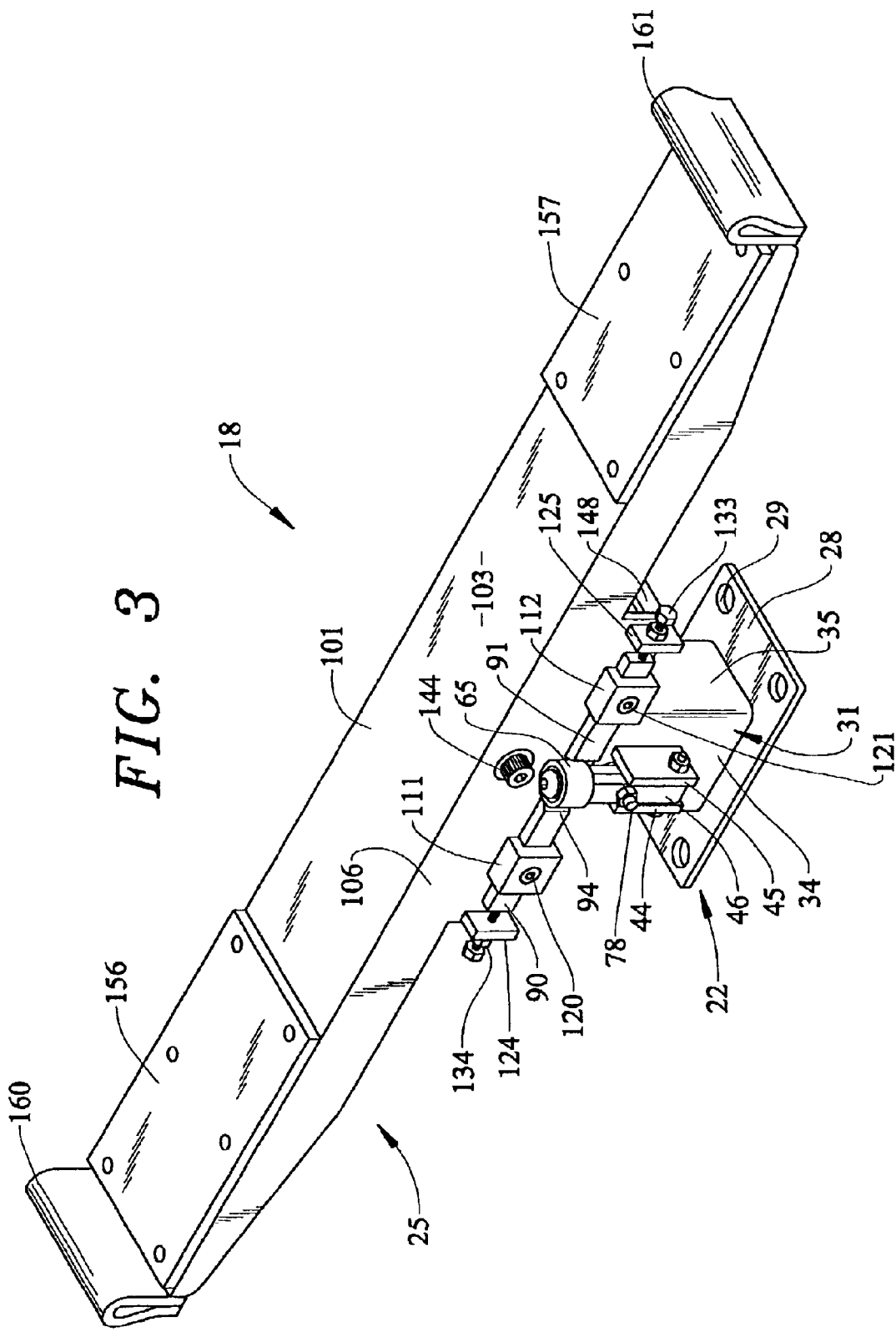

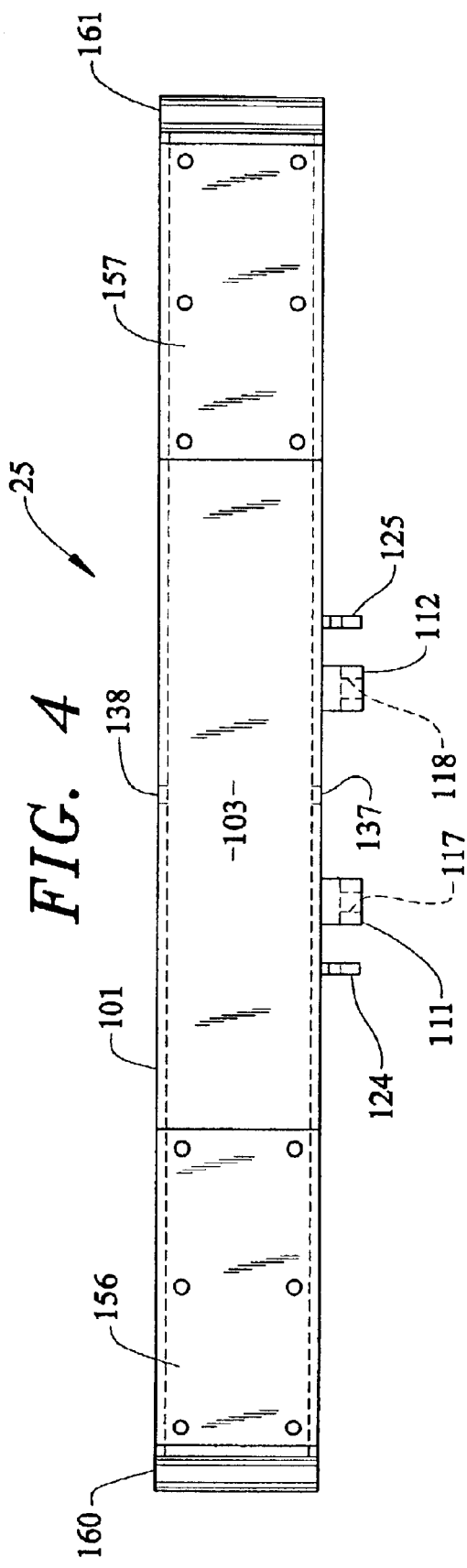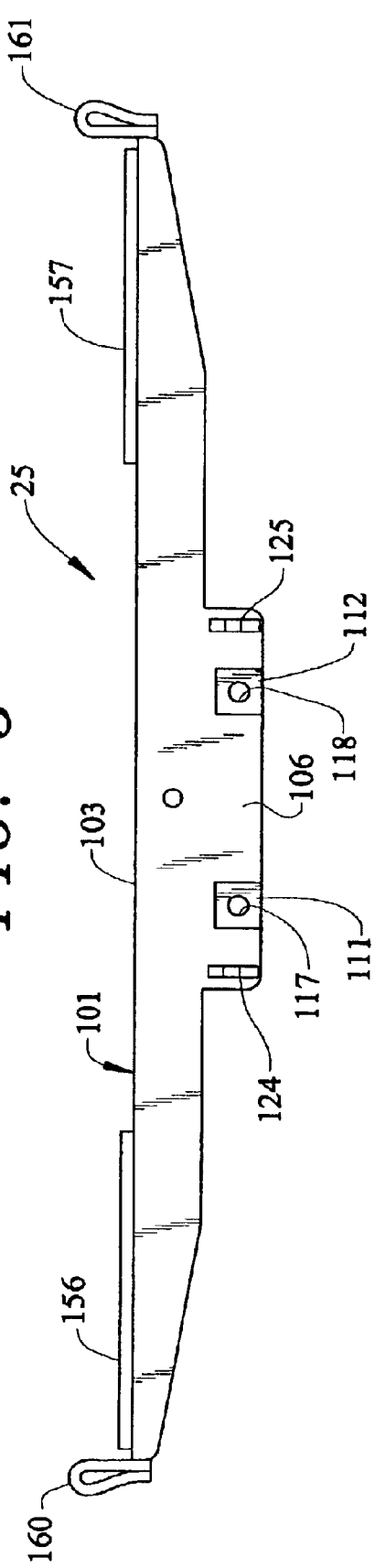

ARTICULATING CABINET SUPPORT ASSEMBLY FOR MOVING CONVEYOR SYSTEM

CROSS-REFERENCE TO RELATED APPLICATIONS

This application claims the benefit of the filing date of U.S. Provisional Patent application 60/324,042 filed Sep. 24, 2001.

BACKGROUND OF THE INVENTION

1. Field of the Invention

The present invention pertains to the art of cabinet assembling and, more specifically, to a cabinet support assembly for a moving conveyor system which enables a cabinet, particularly an appliance cabinet, to be selectively articulated substantially perpendicular to a moving direction of travel along a conveyor during assembly.

2. Discussion of the Art

In assembling various types of cabinets, a formed cabinet is directed along an assembly line upon a conveyor. As the cabinet reaches individual assembly stations, predetermined assembly functions are performed on the cabinet, either by assembly personnel or robotic units. When assembling rather large cabinet arrangements, an assembly operation could require line personnel to stand on a raised support and/or reach a fair distance in order to even access the assembly location. Certainly, this type of arrangement does not represent the most efficient method of aligning and attaching various components to the cabinet.

This problem can particularly occur in the production of various types of appliances, especially refrigerators. In the manufacture of a refrigerator, it is common to have a cabinet, formed from folding a metal cabinet blank, move down an assembly line upon a conveyor, with the cabinet being supported upon one or more fixed blocks attached to the conveyor. Most typically, the refrigerator cabinet would be supported in a fixed position on a back panel portion to expose the open front and other portions for particular assembly operations. The major drawback of such a known arrangement is the difficulties associated with assembling, including the manner of insertion and aligning, of various components given the bulky nature of the refrigerator cabinet, as well as the associated design considerations with respect to the mounting of a liner for the refrigerator. In any event, just given the size of the cabinet, performing certain assembly operations can be difficult.

To address this problem, it would be beneficial to incorporate a versatile cabinet support system for use in the assembly of appliances and other large cabinet arrangements. More particularly, it would be advantageous to employ a cabinet support system which enables a cabinet moving down an assembly line to be readily shifted to an efficient assembly position by tilting of the cabinet relative to the conveyor. Although it is known in the manufacturing art to provide product supports on conveyors wherein the supports can be tilted for various reasons, such as for off-loading of products which need to be sorted, there still exists a need in the art for a reliable and cost effective articulating support assembly which will enable a cabinet on a conveyor to be presented during assembly in an easy and convenient manner that enhances process efficiencies and flexibility so as to provide an optimum arrangement for assembly workmanship.

SUMMARY OF THE INVENTION

The present invention is directed to an articulating cabinet support assembly for a moving conveyor system wherein the support includes a base assembly, fixed to the conveyor, and a movable arm assembly. A cabinet traveling down an assembly line is supported on the arm assembly as the cabinet proceeds through various assembly stations. The arm assembly can articulate relative to the base assembly from a normally horizontal position to a position angled with respect to the direction of travel in order to enhance assembly procedures. Provisions are made to transfer the cabinet onto the arm assembly, with either the top or bottom of the cabinet defining a leading end in the direction of conveyor travel. In accordance with the most preferred form of the invention, the cabinet can be manually tilted, in opposing directions, to an optimal position from either side of the conveyor, while having the arm assembly automatically repositioned to a desired position for return of the support at the end of the conveyor run.

In accordance with a preferred embodiment of the invention, the base assembly includes a mounting plate fixed to a respective portion of the conveyor, an arm assembly pivot mount attached to the mounting plate, and a cam roller assembly. The pivot mount preferably includes a pair of spaced, upstanding plates which define a pivot axis for the articulating arm assembly. The cam roller assembly includes at least one cam roller which is rotatably attached to the arm assembly pivot mount, while being pivotable about an axis which is substantially perpendicular to the direction of travel of the cabinet. An adjustable tension spring arrangement is employed to bias the cam roller towards the pivot mount.

The arm assembly incorporates a cam roller guide including a pair of cam adjustment slides which are selectively, shiftably mounted on opposing sides of the cam roller, with the slides being adjustable towards and away from the cam roller. The slides are preferably constituted by bars having beveled edges adjacent the cam roller, with the bars being shiftable relative to respective slide retainers. The slides function to locate the cam roller by establishing a normal travel or home position for the assembly, with the home position being defined by a space formed between the slides. Each slide can be adjusted by a screw acting on an end portion of the slide and locked into position by a retainer screw which extends through a respective slide retainer.

The arm assembly also includes spaced side members through which the arm assembly is pivotally mounted to the upstanding plates of the base assembly, as well as side guides and rubber padding for supporting the cabinet in a protected manner. In addition, tilt stop plates of the arm assembly extend between the arm members, with adjustable screw stops extending through the stop plates. The screw stops are adapted to abut respective portions of the base assembly to limit the permissible degree of tilting for the arm assembly relative to the base assembly.

With this arrangement, each arm assembly is initially arranged in the home position for receipt of a respective cabinet, with the cam roller being positioned between terminal end portions of the sliders. An optical sensor is employed to coordinate the movement of a deliver conveyor and the conveyor employing the articulating support assembly of the invention. The side guides and padding on the arm assembly are preferably formed of rubber and protect the cabinet against sliding and marring. With the slides adjusted, the arm assembly is allowed to articulate relative to the base assembly, with the roller cam initially riding up the beveled or tapered edge of a respective slider, under increasing spring tension, and then rolling upon an exposed surface of the slider. The tension actually allows a smooth articulation by acting as a counterbalance to offset the weight of the cabinet. The arm assembly can be tilted until the stop screws abut the base assembly. The side guides also function here to retain the cabinet on the arm assembly in the desired, tilted position.

By riding up a respective slider, the arm assembly and, correspondingly, the cabinet can be tilted in opposing directions as needed for enhancing the overall assembly process. Therefore, the cabinet can be arranged in an assembler established, optimal position in each assembly stage. The conveyor can actually be continuously moved during this process or stopped in any number of positions. At least at the end of the conveyor run, fixed guide rail structure of the overall conveyor is provided to engage the arm assembly in order to force the arm assembly back to the home position as the cabinet is removed from the conveyor and the arm assembly continues to a position below the conveyor and back to receive another cabinet.

Additional objects, features and advantages of the present invention will become more readily apparent when the above description is taken in conjunction with the drawings wherein like reference numerals refer to corresponding parts in the several views.

BRIEF DESCRIPTION OF THE DRAWINGS

FIG. 3 is a perspective view of the overall cabinet support arm assembly in an assembled state;

FIG. 4 is a top view of a support arm of the assembly of FIG. 3;

FIG. 5 is a side view of the support arm of FIG. 4;

DETAILED DESCRIPTION OF A PREFERRED EMBODIMENT

Figure 1:
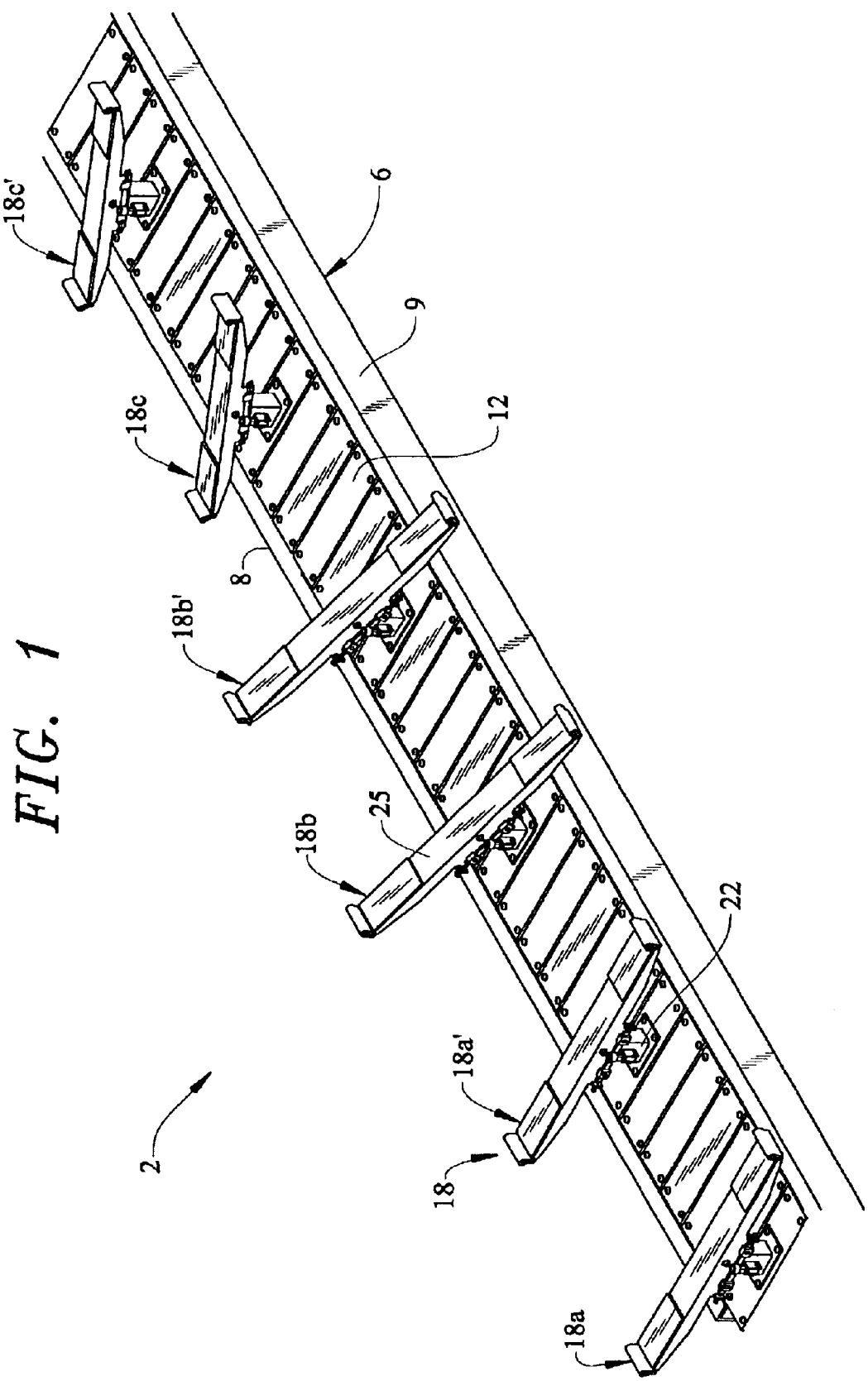
FIG. 1 is a perspective view of a section of a conveyor unit employing the cabinet support assembly of the invention.

With initial reference to FIG. 1, an articulating cabinet support and transport assembly is generally indicated at 2. As discussed more fully below, articulating cabinet support and transport assembly 2 is preferably designed for use in connection with transporting appliance cabinets, such as refrigerator cabinets, down an assembly line, while enabling the cabinets to be pivoted from a normal, substantially horizontal home position to an angled position with respect to the direction of travel in order to enhance is assembly procedures. As illustrated, articulating cabinet support and transport assembly 2 includes a conveyor unit 6 having side rails 8 and 9 which are used to guide conveyor elements 12 along a defined path. In general, conveyor unit 6 can take any form widely known in the art such that the particular construction thereof and the drive mechanism therefor will not be detailed further herein. Of particular concern in connection with the present invention is the inclusion of a plurality of cabinet support arm assemblies 18 which are secured for movement with conveyor 6.

In the most preferred form of the invention wherein articulating cabinet support and transport assembly 2 is used in connection with refrigerator cabinets, cabinet support arm assemblies 18 are preferably arranged in pairs, e.g., 18a and 18a′, 18b and 18b′, 18c and 18c′. Each of these pairs of cabinet support arm assemblies 18 is adapted to support a single cabinet traveling down conveyor unit 6. As illustrated, these pairs of cabinet support arm assemblies 18 can assume different angular positions with respect to the direction of travel. More specifically, each cabinet support arm assembly 18 includes a support base 22 which is fixed to a respective conveyor element 12, and a support arm 25 which is pivotally attached to the support base 22. As will be detailed more fully below, the pairs of cabinet support arm assemblies 18 can be tilted in opposing directions, to an optimum position from either side of conveyor unit 6 to enhance assembly of components within, or enable other operations to be performed on, a respective refrigerator cabinet.

Reference will now be made to FIGS. 2–7 in describing the preferred construction of each cabinet support arm assembly 18 and, particularly, the interconnection between support base 22 and support arm 25. Support base 22 includes a mounting plate 28 provided with a plurality of holes 29. Holes 29 are adapted to receive mechanical fasteners (not shown) for fixedly securing mounting plate 28 to a respective conveyor element 12 as illustrated in FIG. 1. Projecting upward from mounting plate 28 and fixedly secured thereto, such as by welding, is a housing 31. Housing 31 is shown to include sides 34–37. Extending across and fixedly secured to sides 34 and 36 at a top portion (not separately labeled) of housing 31, is a pivot sleeve or journal 40 having an associated central bore 41, and preferably a grease fitting 42 (see FIGS. 6 and 7). Projecting out from side 34 of housing 31 are a pair of fixed, upstanding plates 44 and 45. Upstanding plates 44 and 45 are spaced to receive an arm member 46 of an adjustable arm assembly generally indicated at 47. More specifically, arm member 46 is provided with a lower through hole 50, while upstanding plates 44 and 45 are provided with aligned apertures 51 and 52 respectively. A bolt 54 extends through aperture 51, through hole 50 and aperture 52 in order to pivotally connect arm member 46 to upstanding plates 44 and 45. A nut 55 is threadably attached to bolt 54 to secure the mounting of arm member 46, while still permitting the relative pivotal movement between arm member 46 and housing 31. Arm member 46 is also provided with a substantially central hole 59 and an upper, axial bore 62. At upper axial bore 62, a cam roller 65 is attached to arm member 46 through a fastener 68. In this manner, cam roller 65 is fixed to arm member 46 for pivotal movement relative to housing 31, while cam roller 65 is also able to rotate relative to arm member 46.

Figure 2:
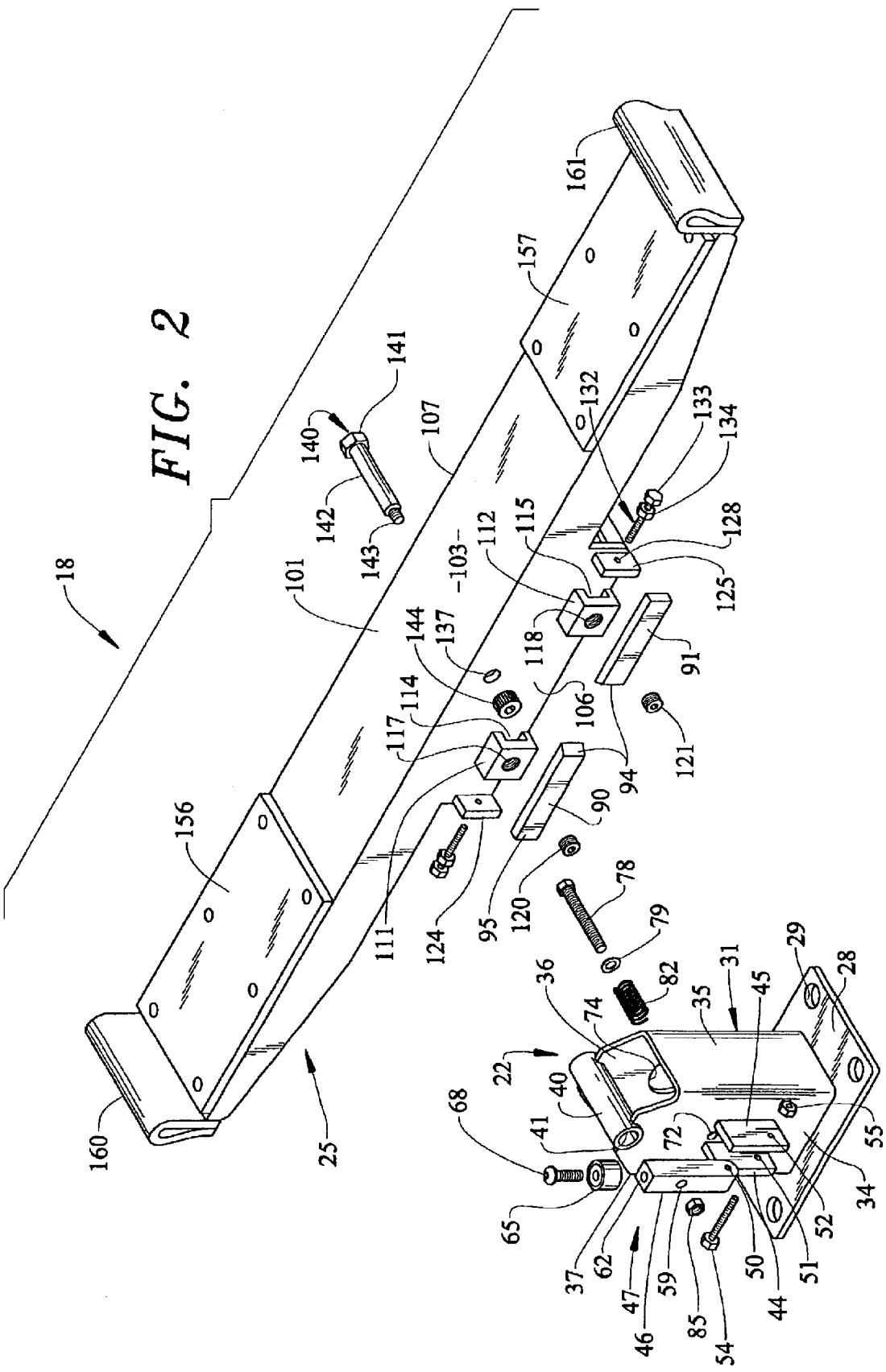
FIG. 2 is an exploded view of an overall cabinet support arm assembly constructed in accordance with a preferred embodiment of the invention.
Figure 6:
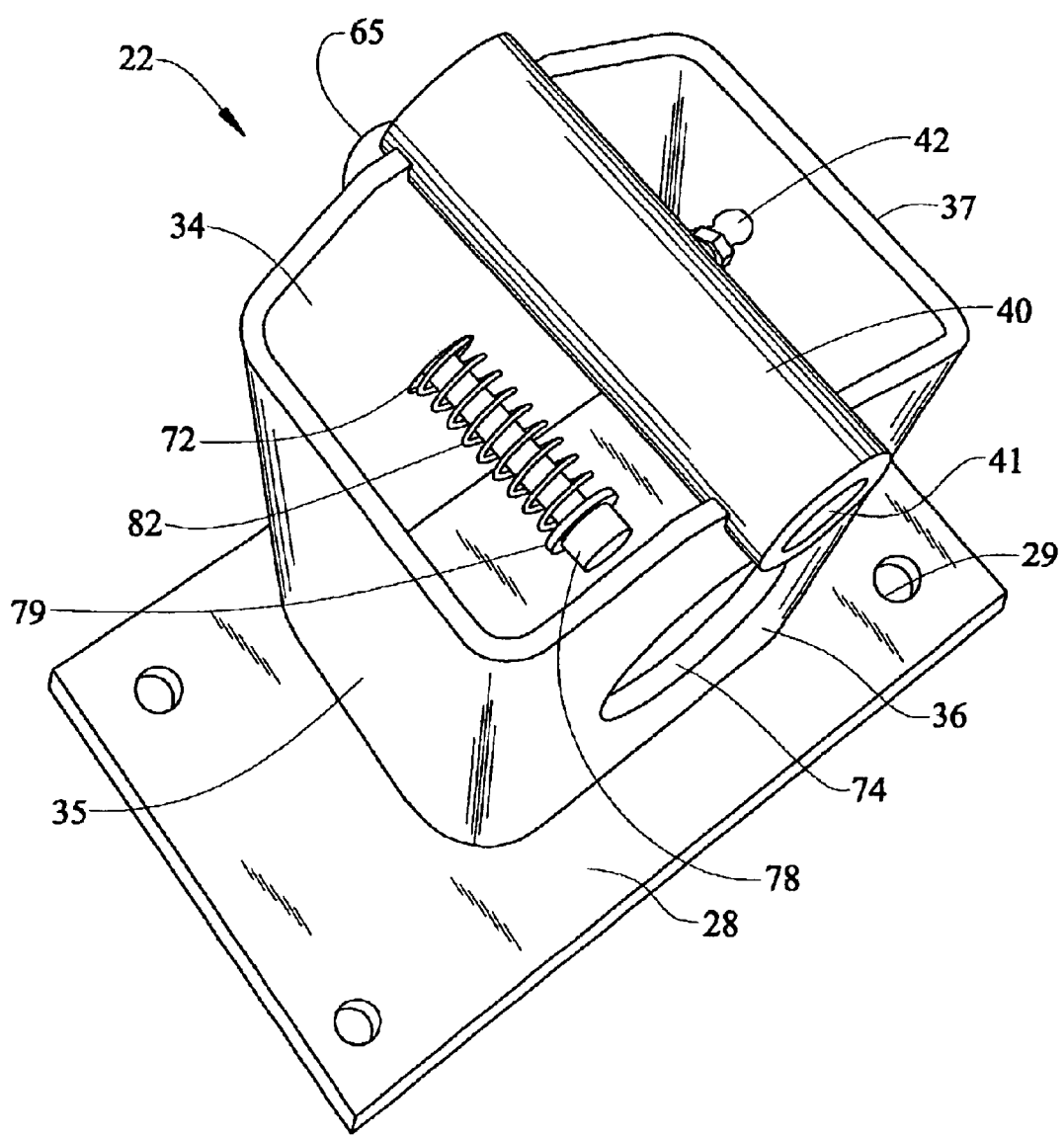
FIG. 6 is an upper perspective view of a support base employed in the cabinet support assembly of the invention.
Figure 7:
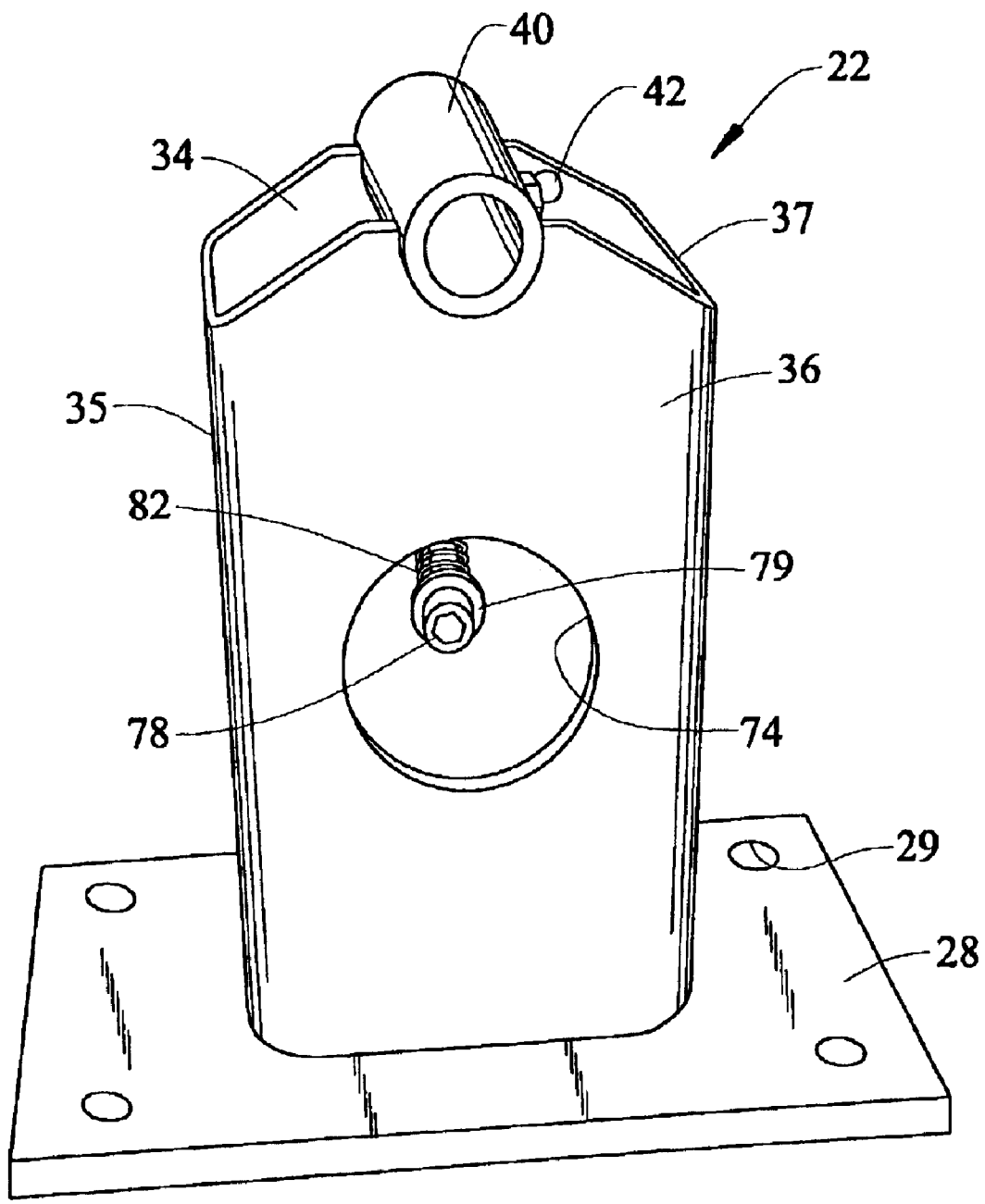
FIG. 7 is another perspective view of the support base.

As perhaps best shown in FIGS. 2, 6 and 7, side 34 of housing 31 is provided with an aperture 72, while side 36 of housing 31 is provided with an enlarged opening 74. A bolt 78, which receives a washer 79 and a tension spring 82, extends through opening 74 and aperture 72 in housing 31, as well as through central hole 59 of arm member 46. A nut 85 is attached at the portion of bolt 78 extending through arm member 46. With this construction, an adjustable tension spring arrangement is defined with tension spring 82 acting between side 34, within housing 31, and washer 79 to bias arm member 46 and cam roller 65 toward side 34 and pivot sleeve 40. Prior to detailing the preferred construction of support arm 25 and the manner in which support arm 25 is attached to support base 22, at this point it should be noted that the overall adjustable arm assembly 47 also includes a pair of cam adjusting slides 90 and 91, each including a first end 94, which is preferably beveled, and a second end 95. As will be detailed more fully below, cam adjustment slides 90 and 91 can be adjusted to establish a desired neutral or home position for support arm 25. At the same time, the tension of spring 82 can be selectively adjusted to alter the counterforce required to be overcome in tilting support arm 25 relative to support base 22.

In accordance with the most preferred form of the invention, support arm 25 includes a plate 101 having an upper surface 103, as well as side members 106 and 107. Fixedly attached to each side member 106 is a pair of spaced slide retainers 111 and 112. As shown, each slide retainer 111, 112 is preferably C-shaped so as to define a respective through channel 114, 115. In addition, slide retainers 111 and 112 are provided with respective cross openings 117 and 118 which, in turn, are adapted to receive respective set screws 120 and 121. Each slide retainer 111, 112 also has associated therewith, but spaced therefrom, an end plate 124, 125, with each end plate 124, 125 being provided with a threaded opening indicated at 128. At this point, it should be understood that slide retainers 111 and 112, as well as end plates 124 and 125, are fixedly secured to side member 106. The through channel 114, 115 of each slide retainer 111, 112 is adapted to slidably receive a respective one of cam adjustment slides 90, 91, with the beveled ends 94 of the cam adjustment slides 90 and 91 facing each other.

Obviously, the permissible sliding range of each cam adjustment slide 90 and 91 relative to slide retainers 111 and 112 will be limited, at least in one direction, by a respective end plate 124, 125. In fact, a respective slide adjustment screw 132, provided with a head 133 and additional nut 134, is threadably received in the opening 128 of each end plate 124, 125 to further control the permissible shifting of cam adjustment slides 90 and 91. That is, instead of abutting a respective end plate 124, 125, the cam adjustment slides 90 and 91 will be limited in travel in one direction by abutting an end, not separately labeled, of a respective slide adjustment screw 132, depending upon the degree to which the slide adjustment screw 132 extends through threaded opening 128. In addition, set screws 120 and 121 are threadably received in cross openings 117 and 118 respectively, and adapted to be tightened down to fix cam adjustment slides 90 and 91 in desired positions, as will be detailed more fully below.

Support arm 25 is adapted to be mounted atop support base 22 with pivot sleeve 40 extending between side members 106 and 107. Side members 106 and 107 are formed with aligned holes 137 and 138 which are adapted to receive a mechanical fastener 140. In the most preferred form of the invention, mechanical fastener 140 takes the form of a bolt having a head 141, a smooth shaft portion 142 and a threaded end 143. Mechanical fastener 140 actually extends into hole 138, through pivot sleeve 40, and then through hole 137 whereupon threaded end 143 is exposed. A nut 144 is then tightened onto threaded end 143 until it abuts shaft portion 142. In this manner, support arm 25 is pivotally attached to support base 22, which enables tilting of support arm 25 relative to conveyor unit 6.

When support arm 25 is attached to support base 22, side member 106 extends downward between side 34 of housing 31 and arm member 46 of adjustable arm assembly 47. As arm member 46 is biased by the inclusion of tension spring 82 toward side 34, cam roller 65 actually abuts side member 106. In this sense, as support arm 25 is tilted relative to support base 22, roller cam 65 would ride along the surface defined by side member 106. However, in the assembled state shown in FIG. 2, the beveled ends 94 of cam adjustment slides 90 and 91 are arranged on either side of cam roller 65. In this manner, with the adjustment of cam adjusting slides 90 and 91 through slide adjustment screws 132 and set screws 120 and 121, a centered home or neutral position can be established for support arm 25 of each cabinet support arm assembly 18. In the most preferred form of the invention, this home position is established when upper surface 103 of each support arm 25 extends in a substantially horizontal plane as represented by cabinet support arm assemblies 18*a* and 18*a'* represented in FIG. 1. This home position is preferably utilized for loading of a cabinet upon a respective set or pair of cabinet support arm assemblies 18 as will be discussed more fully below.

When a cabinet is being transported down an assembly line in accordance with the invention, it is advantageous to readily reposition the cabinet in order to enhance the performing of certain operational procedures on particular portions of the cabinet. Therefore, although the overall mounting of support arm 25 to support base 22 and the inclusion of adjustable arm assembly 47 advantageously establishes the home position for each cabinet support arm assembly 18, this structure also enables pivoting of each support arm 25 relative to its support base 22 to either side of conveyor unit 6.

Figure 8:
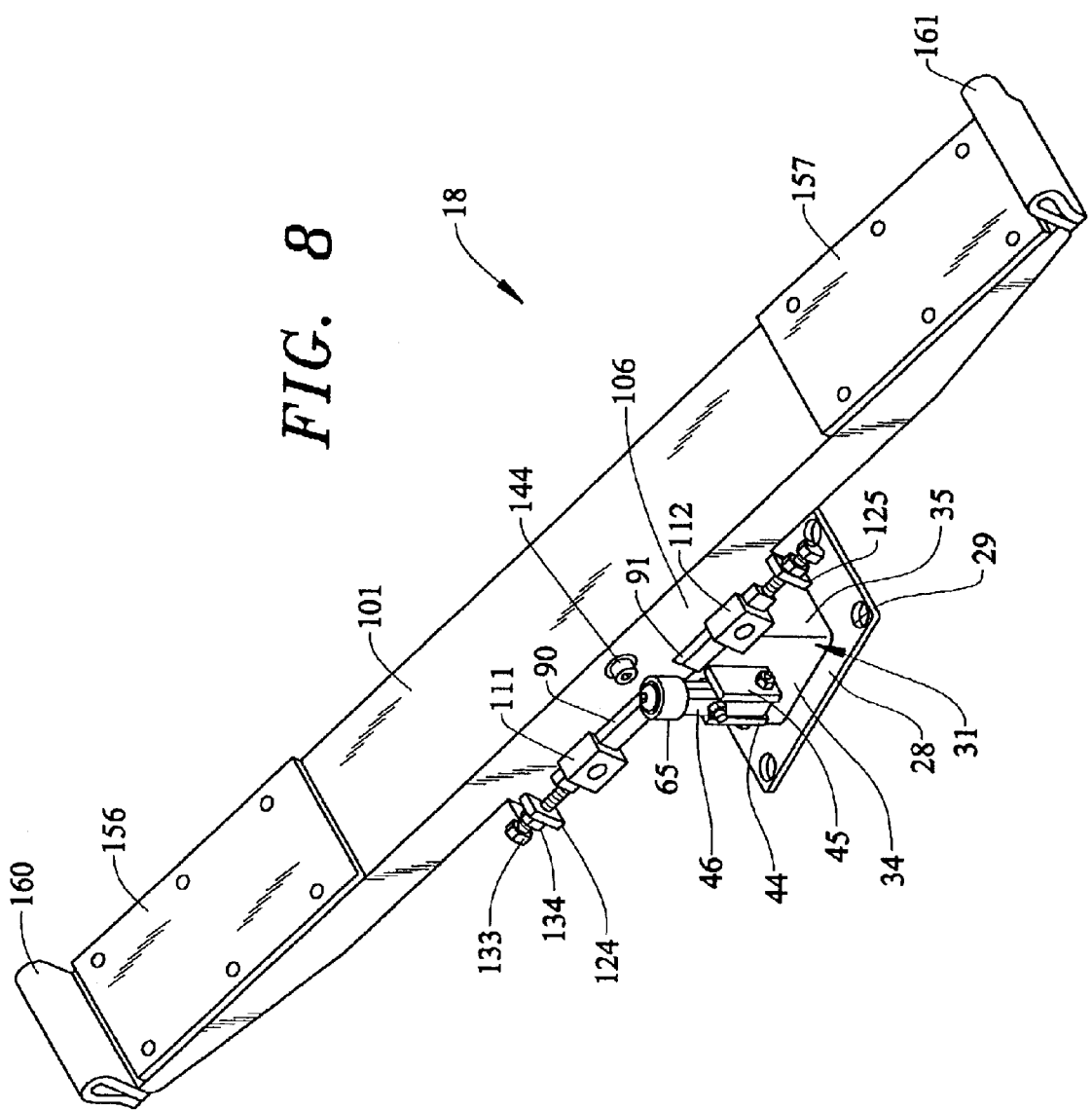
FIG. 8 illustrates a repositioning of the cabinet support arm assembly from a central or home position shown in FIG. 3.
Figure 9:
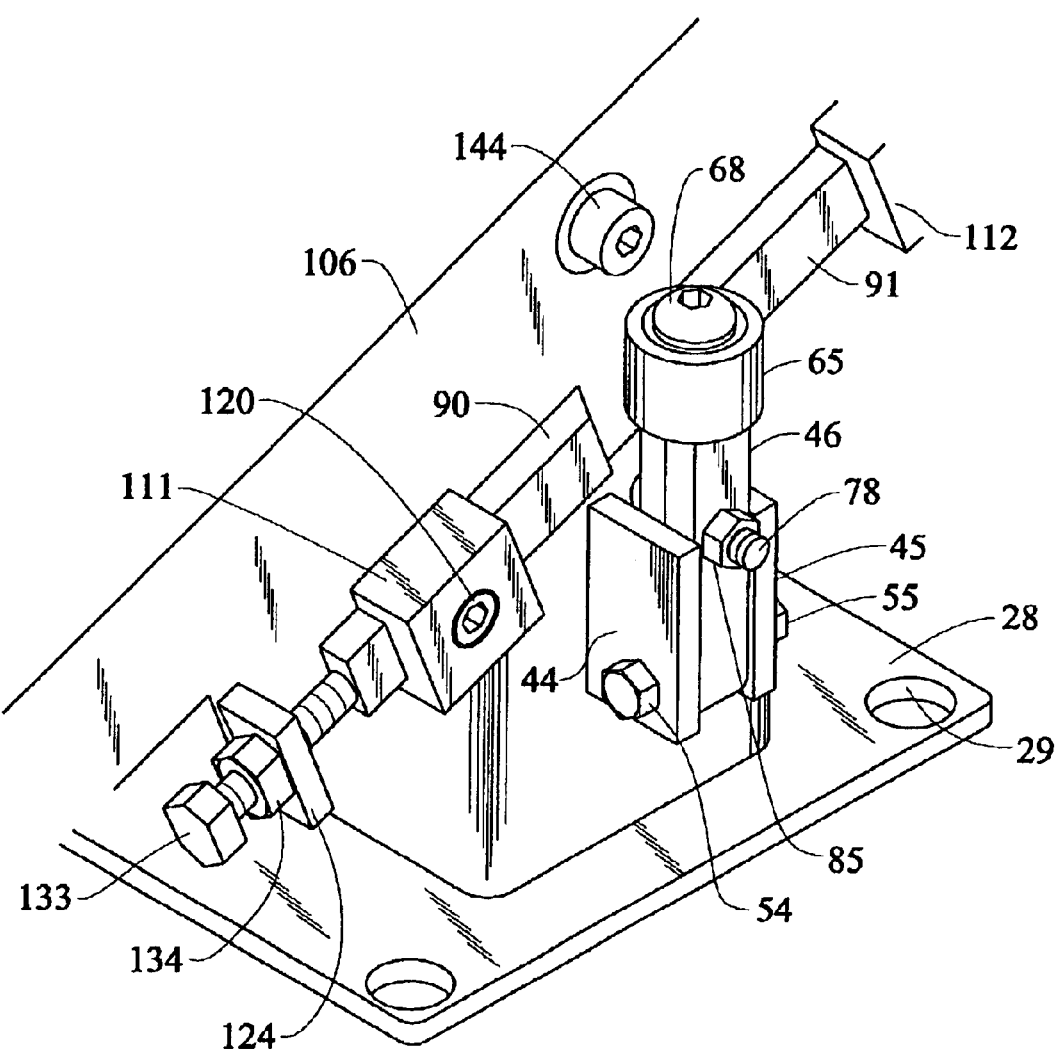
FIG. 9 is an enlarged perspective view of an adjustable arm assembly employed in the overall cabinet support assembly of the invention.
Figure 10:
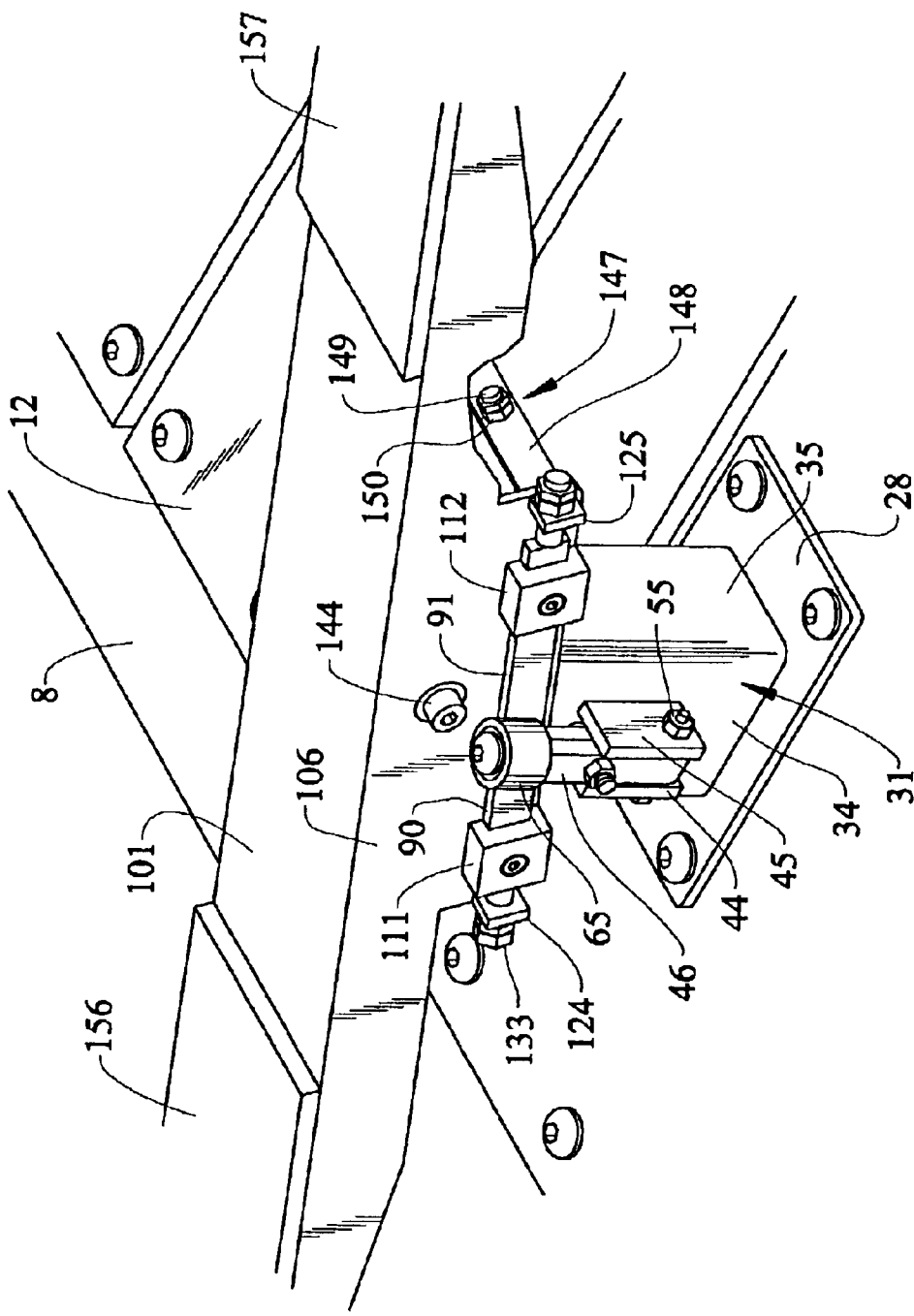
FIG. 10 is a perspective view of the cabinet support assembly of the invention illustrating a tilt stop mechanism employed therein.

With reference to FIGS. 8 through 10, it should be readily apparent that support arm 25 can pivot relative to support base 22 about an axis defined by mechanical fastener 140 and pivot sleeve 40. Due to the positioning of cam roller 65 between cam adjustment slides 90 and 91, and the tension applied to arm member 46 by spring 82, there is an initial resistance to any pivoting of support arm 25 relative to support base 22. However, with ends 94 of each cam adjustment slide 90, 91 being advantageously beveled and the tension of spring 82 being adjustable by tightening or loosening the connection between bolt 78 and nut 85, the force that needs to be overcome in order to tilt support arm 25 can be controlled.

More specifically, with cam adjustment slides 90 and 91 initially adjusted, adjustable arm assembly 47 is allowed to articulate relative to support base 22, with cam roller 65 initially riding up the beveled or tapered end 94 of a respective cam adjustment slide 90, 91, under increasing tension created by spring 82, and then rolling upon the flat surface (not separately labeled) of a respective cam adjustment slide 90, 91. The tension actually allows a smooth articulation by acting as a counterbalance to offset the weight of the supported cabinet. Therefore, in FIG. 8, support arm 25 is shown to be tilted in one direction relative to support base 22 in a manner corresponding to cabinet support arm assemblies 18*b* and 18*b'* of FIG. 1. In achieving this position, cam roller 65 has ridden up the beveled end 94 of cam adjustment slide 90 and essentially rides along an arcuate path upon a flat portion of cam adjustment slide 90, directly adjacent to first end 94.

At this point, it should be noted that the width of each cam adjustment slide 90, 91 is established to assure that cam roller 65 cannot roll off a side edge thereof. To further assure this arrangement, each cabinet support arm assembly 18 is provided with a tilt stop mechanism 147, best illustrated in FIG. 10. In a preferred embodiment of the invention, tilt stop mechanism 147 includes a tilt stop plate 148 which extends between and is fixedly secured to each of side members 106 and 107, as well as a threaded fastener 149 and an additional nut 150. Threaded fastener 149 is threadably attached to tilt stop plate 148 and projects therethrough toward housing 31. Although not shown, an enlarged stopper member can be attached to the remote threaded end of fastener 149. In addition, it should be realized that a corresponding tilt stop mechanism 147 is provided on support arm 25 on the other side of housing 31. With this structure, threaded fastener 149 can be adjusted relative to tilt stop plate 148 and then nut 150 can be tightened to secure the relative positioning between threaded fastener 149 and tilt stop plate 148. Thereafter, when support arm 25 is tilted relative to support base 22, the permissible degree of pivoting is limited by a respective tilt stop mechanism 147 abutting housing 31.

As shown best in FIGS. 2–5, each support arm 25 is preferably provided with padding 156 and 157 which is secured upon a respective upper surface 103. In addition, side pads 160 and 161 are also preferably provided at the terminal ends of each support arm 25. Padding 156, 157 and side pads 160, 161, all of which are preferably formed of rubber, aid in supporting and locating a cabinet upon a respective pair of cabinet support arm assemblies 18 in a protected manner. Side pads 160 and 161 also define guides which properly locate a cabinet upon cabinet support arm assemblies 18, as well as slide stops which properly retain the cabinet on the support arm assemblies 18 upon tilting of the support arms 25.

Figure 11:
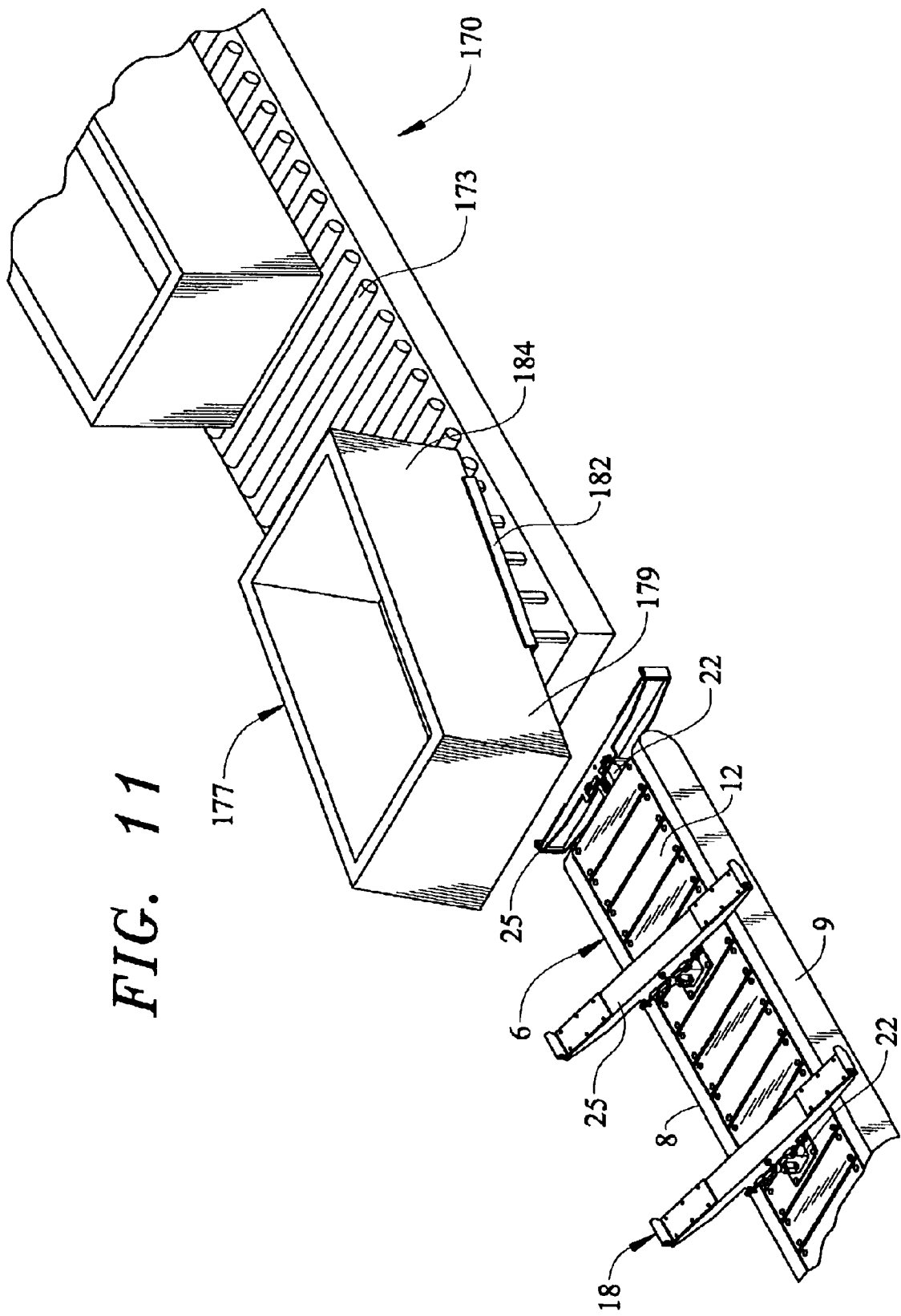
FIG. 11 illustrates a loading stage associated with the cabinet support assembly of the invention.

With reference to FIG. 11, depicted is conveyor unit 6 arranged adjacent to and aligned with a second conveyor unit 170. As shown, second conveyor unit 170 includes a plurality of rollers 173 upon which are transported refrigerator cabinets 177. As each refrigerator cabinet 177 reaches a terminal portion of second conveyor unit 170, a top or upper section 179 of the refrigerator cabinet 177 is directed upon a ramp 182. From beneath upper portion 179 comes a cabinet support arm assembly 18 riding about conveyor unit 6. Conveyor units 6 and 170 are arranged and operated such that cabinet 177 is positioned to become seated upon padding 156 and 157, between side pads 160 and 161, and slightly lifted by the next support arm 25. Further movement of conveyor unit 6 causes cabinet 177 to move further along second conveyor unit 170 until an associated cabinet support arm assembly 18 of the respective pair for the particular cabinet 177 becomes arranged beneath and lifts a rear or lower portion 184 of cabinet 177 completely off of second conveyor unit 170. In a corresponding manner, each successive pair of cabinet support arm assemblies 18 would have transferred thereto a respective cabinet 177.

In FIG. 11, a forward pair of cabinet support arm assemblies 18 are depicted in a tilted position for exemplary purposes only. Typically, the support arm assemblies 18 would remain in the neutral or home position with a cabinet 177 spanning therebetween until the particular cabinet 177 reaches a defined assembly station at which time manufacturing personnel would manually tilt cabinet 177 by pivoting the support arms 25 relative to the respective support bases 22 in the manner described above. Cabinet 177 could then remain tilted for certain successive stages of assembly or could be repositioned back into the home position at any point. In addition, cabinet 177 could be manually tilted in the reverse direction as needed. With this arrangement, it should be readily apparent that access to certain portions of cabinet 177 will be greatly enhanced and a relatively simple mechanism which accommodates a wide range of adjustments is employed to perform this task. This is considered to be particularly advantageous over any type of expensive robotic system as each cabinet 177 can be readily repositioned by assembly line personnel and the overall mechanism can be easily adjusted to accommodate the particular degree of tilting and tension force considered advantageous to the line worker(s).

Figure 12:
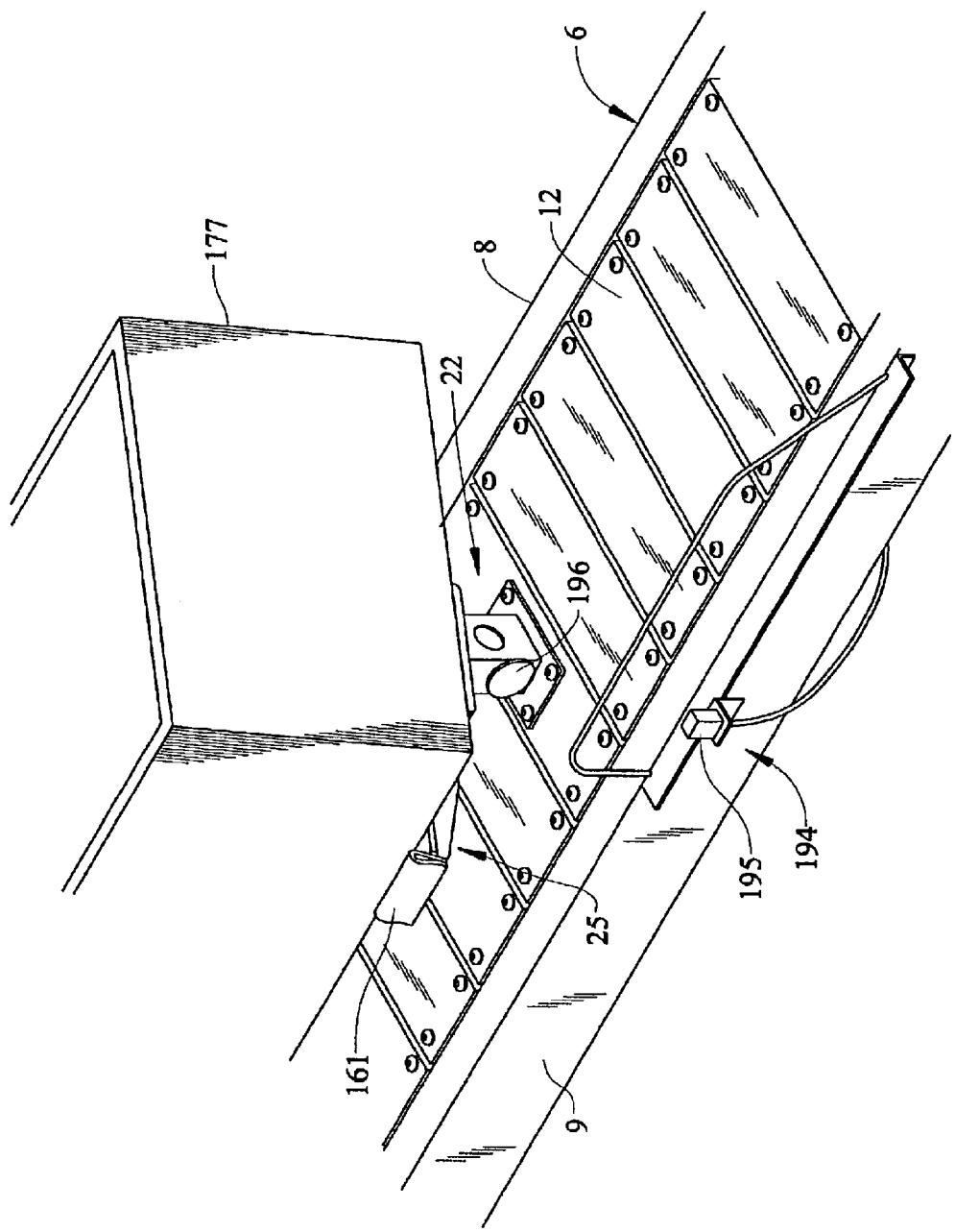
FIG. 12 is a perspective view of a portion of the cabinet support assembly, particularly illustrating a timing mechanism employed therein.

In connection with timing the movement of conveyor unit 6 to conveyor unit 170, the present invention takes the advantage of an optical sensor arrangement, generally indicated at 194 in FIG. 12. In accordance with the most preferred embodiment of the invention, an optical beam/eye unit 195 is preferably mounted in a fixed position along guide rail 8 of conveyor unit 6 and alternating support bases 22 are provided with a reflector unit 196. As beam/eye unit 195 detects reflector unit 196, this information is conveyed to a controller (not shown) used to regulate the operation of each of conveyor unit 6 and 170. In this manner, a refrigerator cabinet 177 can assume the position shown in FIG. 11 for proper transfer to the respective support arms 25.

Figure 13:
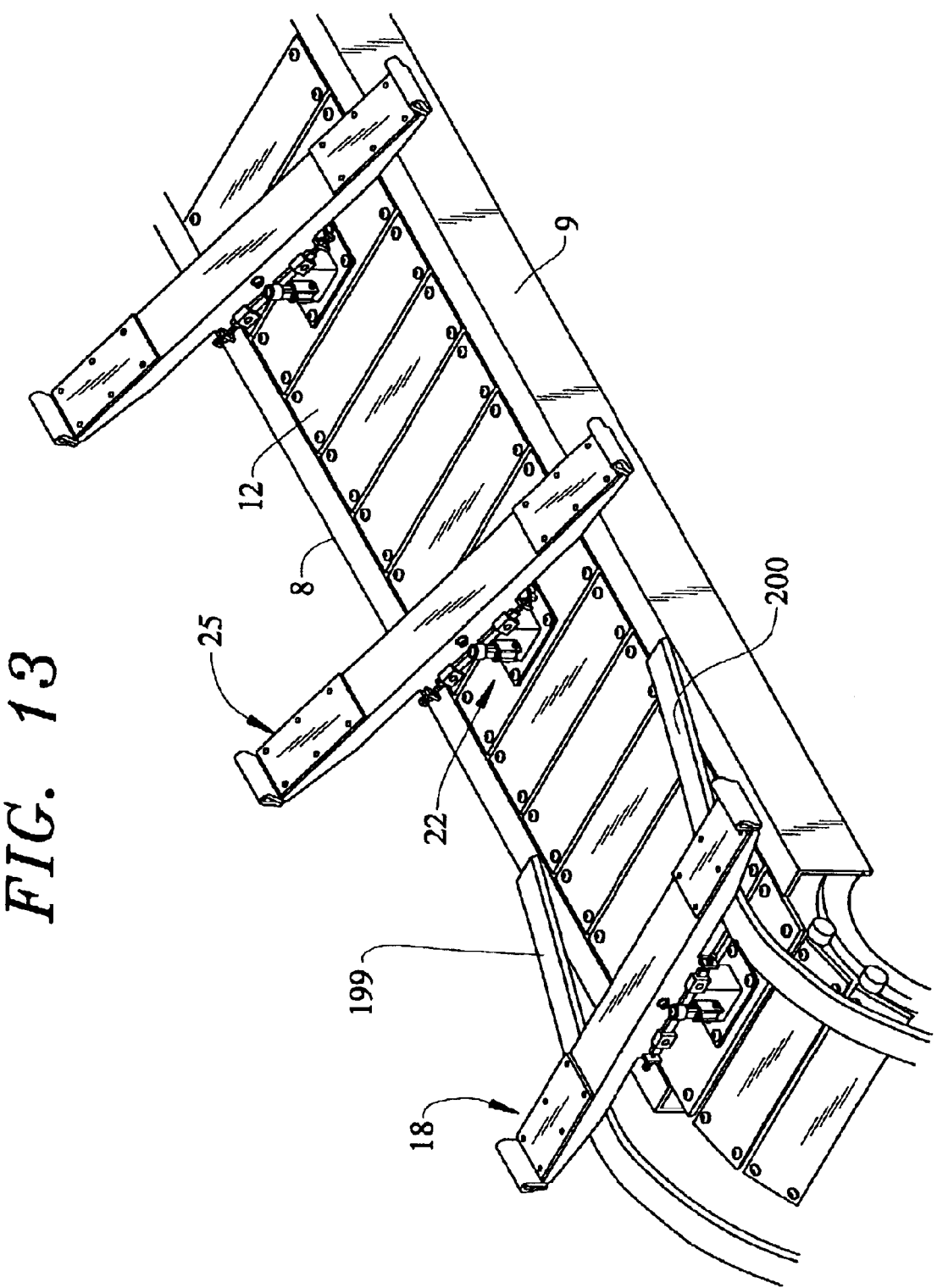
FIG. 13 is a perspective view showing an automatic centering mechanism employed at a terminal conveyor portion for the overall cabinet support assembly.

In the most preferred form of the invention, as described above, the cabinet support arm assemblies 18 are manually tilted to desired operating positions. It is also desired to employ structure which causes automatic tilting of support arms 25. In particular, FIG. 13 illustrates a terminal end of conveyor unit 6 wherein cabinets 177 have already been transferred but yet various support arms 25 can reach this location in a tilted manner. Since this is the end of conveyor unit 6, the various support arms 25 will be returning back beneath side guard rails 8 and 9, it is desired to place support arms 25 in the neutral or home position for this return such that they are in the proper position to receive a new cabinet 177 in the manner represented in FIG. 11. For this purpose, a pair of centering rails 199 and 200 are provided at the end of conveyor unit 6. Regardless of the tilting direction of support arms 25, the support arms 25 will be forced to ride up at least one of centering rails 199 and 200 and will be forced to assume a desired return position. Therefore, the fixed centering rails 199 and 200 force each overall cabinet support arm assembly 18 back to a home or neutral position as the respective support arm assembly 18 continues to a position below conveyor unit 6 and back to receive another cabinet 177.

Although described with reference to a preferred embodiment of the invention, it should be readily understood that various changes and/or modifications can be made to the invention without departing from the spirit thereof. For instance, although the invention has been described in connection with manufacturing a refrigerator, the invention can also be used in connection with making other products extending down an assembly line, particularly other appliances. In addition, although the invention has been described with multiple support arms working in conjunction to support a single product, the invention can actually be employed with products requiring one or more support arms, the dimensions of which would be correspondingly adjusted. In general, the invention is only intended to be limited by the scope of the following claims.

We claim:

1. An articulating cabinet support assembly for arranging a cabinet in a desired operating position along an assembly line comprising:

a movable conveyor unit;

a support base fixed to a portion of the movable conveyor unit;

a support arm adapted to support a cabinet moving down an assembly line upon the conveyor unit, said support arm being pivotally attached to the support base for movement between at least first and second positions;

an adjustable arm assembly including an arm member biased toward the support arm, wherein the support arm can be selectively shifted from the first position to the second position against a biasing force of the adjustable arm assembly to provide additional access to the cabinet along the assembly line; and means for adjusting the biasing force of the adjustable arm assembly.

2. The articulating cabinet support assembly according to claim 1, wherein the arm member of the adjustable arm assembly is mounted for pivotal movement relative to the support arm and biased toward the support arm.

3. The articulating cabinet support assembly according to claim 2, wherein the support base includes a pair of spaced plates, the arm member of the adjustable arm assembly being pivotally attached between the pair of spaced plates.

4. The articulating cabinet support assembly according to claim 2, wherein the adjustable arm assembly includes a spring for biasing the arm member toward the support arm.

5. The articulating cabinet support assembly according to claim 4, wherein the spring is located within the support base.

6. The articulating cabinet support assembly according to claim 5, wherein the spring constitutes a tension spring.

7. An articulating article support assembly for arranging an article in a desired operating position along an assembly line comprising:

a movable conveyor unit;

a support base fixed to a portion of the movable conveyor unit;

a support arm adapted to support an article moving down an assembly line upon the conveyor unit, said support arm being pivotally attached to the support base for movement between at least first and second positions; and an adjustable arm assembly including an arm member biased toward the support arm, wherein the support arm can be selectively shifted from the first position to the second position against a biasing force of the adjustable arm assembly to provide additional access to the article along the assembly line, wherein the arm member of the adjustable arm assembly is mounted for pivotal movement relative to the support arm and biased toward the support arm, and wherein the adjustable arm assembly includes a cam roller rotatably mounted on the arm member, said cam roller being shiftable relative to both the support base and the support arm.

8. The articulating article support assembly according to claim 7, further comprising means for adjusting the biasing force of the adjustable arm assembly.

9. The articulating article support assembly according to claim 7, further comprising at least one cam adjustment slide attached to the support arm, said cam roller being adapted to engage the adjustment slide.

10. The articulating article support assembly according to claim 9, wherein first and second cam adjustment slides are attached to the support arm, the first and second cam adjustment slides including respective inner ends which are spaced from one another.

11. The articulating article support assembly according to claim 10, wherein each of the inner ends of the first and second cam adjustment slides are beveled.

12. The articulating article support assembly according to claim 9, further comprising a slide retainer carried by the support arm, said at least one cam adjustment slide being guided for shifting movement relative to the support arm within the slide retainer.

13. The articulating article support assembly according to claim 12, further comprising a slide adjustment screw for slidably shifting the at least one cam adjustment slide relative to the support arm.

14. The articulating article support assembly according to claim 12, further comprising a set screw for selectively fixing the at least one cam adjustment slide relative to the support arm.

15. The articulating article support assembly according to claim 14, wherein the set screw extends through the slide retainer.

16. An articulating article support assembly for arranging an article in a desired operating position along an assembly line comprising:

a movable conveyor unit;

a support base fixed to a portion of the movable conveyor unit;

a support arm adapted to support an article moving down an assembly line upon the conveyor unit, said support arm being pivotally attached to the support base for movement between at least first and second positions; and an adjustable arm assembly including an arm member biased toward the support arm, wherein the support arm can be selectively shifted from the first position to the second position against a biasing force of the adjustable arm assembly to provide additional access to the article along the assembly line, wherein the support arm includes an upper surface provided with padding for preventing shifting of an article placed on the support arm.

17. The articulating article support assembly according to claim 16, wherein the support arm is provided with a pair of side guides for supporting an article.

18. An articulating article support assembly for arranging an article in a desired operating position alone an assembly line comprising:

a movable conveyor unit;

a support base fixed to a portion of the movable conveyor unit;

a support arm adapted to support an article moving down an assembly line upon the conveyor unit, said support arm being pivotally attached to the support base for movement between at least first and second positions;

an adjustable arm assembly including an arm member biased toward the support arm, wherein the support arm can be selectively shifted from the first position to the second position against a biasing force of the adjustable arm assembly to provide additional access to the article along the assembly line; and a tilt stop mechanism acting between the support arm and the support base for limiting a degree of pivoting of the support arm relative to the support base.

19. The articulating article support assembly according to claim 18, wherein the tilt stop mechanism is selectively adjustable to alter the degree of pivoting.

20. The articulating article support assembly according to claim 19, wherein the tilt stop mechanism includes a tilt adjustment screw for selectively altering the permissible degree of pivoting.

21. The articulating cabinet support assembly according to claim 1, wherein the support base includes a pivot sleeve, said support arm being pivotally attached to the support base at the pivot sleeve.

22. The articulating cabinet support assembly according to claim 21, the support base includes a housing, said pivot sleeve being mounted atop the housing, the arm member of said adjustable arm assembly being pivotally attached to the housing of the support base.

23. An articulating article support assembly for arranging an article in a desired operating position along an assembly line comprising:

a movable conveyor unit;

a support base fixed to a portion of the movable conveyor unit;

a support arm adapted to support an article moving down an assembly line upon the conveyor unit, said support arm being pivotally attached to the support base for movement between at least first and second positions;

an adjustable arm assembly including an arm member biased toward the support arm, wherein the support arm can be selectively shifted from the first position to the second position against a biasing force of the adjustable arm assembly to provide additional access to the article along the assembly line; and a centering rail attached to the conveyor unit for automatically shifting the support arm to the first position as the support arm is moved along the conveyor unit.

24. An articulating article support assembly for arranging an article in a desired operating position alone an assembly line comprising:

a movable conveyor unit;

a support base fixed to a portion of the movable conveyor unit;

a support arm adapted to support an article moving down an assembly line upon the conveyor unit, said support arm being pivotally attached to the support base for movement between at least first and second positions;

an adjustable arm assembly including an arm member biased toward the support arm, wherein the support arm can be selectively shifted from the first position to the second position against a biasing force of the adjustable arm assembly to provide additional access to the article alone the assembly line; and an optical sensor unit for sensing a position of the support arm along the conveyor unit.

* * * * *